US012801141B2

(12) United States Patent
He

(10) Patent No.: US 12,801,141 B2
(45) **Date of Patent: *Nov. 17, 2026**

(54) SELF-MOVING DEVICE, SERVER, AND AUTOMATIC WORKING SYSTEM THEREOF

(71) Applicant: Positec Power Tools (Suzhou) Co., Ltd, Jiangsu (CN)

(72) Inventor: Mingming He, Suzhou (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 87 days.

This patent is subject to a terminal disclaimer.

(21) Appl. No.: 18/902,759

(22) Filed: Sep. 30, 2024

(65) Prior Publication Data

US 2025/0021098 A1 Jan. 16, 2025

Related U.S. Application Data

(63) Continuation of application No. 17/048,566, filed as application No. PCT/CN2019/083539 on Apr. 19, 2019, now Pat. No. 12,135,562.

(30) Foreign Application Priority Data

Apr. 19, 2018 (CN) ........................ 201810354642.X

(51) Int. Cl.
*G05D 1/661* (2024.01)
*G05D 1/00* (2006.01)
(Continued)

(52) U.S. Cl.
CPC ......... *G05D 1/0246* (2013.01); *G05D 1/0214* (2013.01); *G05D 1/0219* (2013.01);
(Continued)

(58) Field of Classification Search
CPC .. G05D 1/0246; G05D 1/0214; G05D 1/0219; G05D 1/0221; G05D 1/0225;
(Continued)

(56) References Cited

U.S. PATENT DOCUMENTS

2016/0163029 A1* 6/2016 Gibbon ................ G06V 10/772
382/190
2018/0018518 A1 1/2018 Rajkumar et al.
(Continued)

FOREIGN PATENT DOCUMENTS

CN 1381339 11/2002
CN 104574489 A 4/2015
(Continued)

OTHER PUBLICATIONS

CN104575489 Robot identification system.pdf (translation of CN-104575489-A) (Year: 2003).*
(Continued)

*Primary Examiner* — Bao Long T Nguyen
(74) *Attorney, Agent, or Firm* — Lee & Hayes, P.C.

(57) ABSTRACT

A self-moving device including an image detection module, detecting an environment around the self-moving device to generate an environmental image; a first recognition module, recognizing a specific object in the image based on the environmental image to generate a first recognition signal; a first communication module, selectively sending the environmental image and/or the first recognition signal to a server and receiving a second recognition signal corresponding to the environmental image; and a control module, controlling an action of the self-moving device according to the first recognition signal and/or the second recognition signal. The techniques ensure that the self-moving device obtains an accurate recognition result in time and performs an action accordingly.

20 Claims, 4 Drawing Sheets

(51) Int. Cl.
*G05D 1/249* (2024.01)
*G05D 1/617* (2024.01)
*G05D 1/648* (2024.01)
*G06N 3/08* (2023.01)

(52) U.S. Cl.
CPC ......... *G05D 1/0221* (2013.01); *G05D 1/0225* (2013.01); *G05D 1/249* (2024.01); *G05D 1/617* (2024.01); *G05D 1/648* (2024.01); *G05D 1/661* (2024.01); *G06N 3/08* (2013.01)

(58) Field of Classification Search
CPC ........... G05D 2201/0208; G05D 1/249; G05D 1/617; G05D 1/648; G05D 1/661; G06V 10/94; G06V 20/10; G06V 10/82; G06V 10/70; G06V 10/95; G06V 20/00; G06N 3/08; G06N 3/0464; G06N 3/09
See application file for complete search history.

(56) References Cited

U.S. PATENT DOCUMENTS

| | | | | |
|---|---|---|---|---|
| 2018/0173237 | A1 | 6/2018 | Reiley et al. | |
| 2018/0181868 | A1* | 6/2018 | Chew | H04L 67/12 |
| 2018/0204562 | A1* | 7/2018 | Gong | G06V 10/82 |

FOREIGN PATENT DOCUMENTS

| | | | |
|---|---|---|---|
| CN | 104575489 | | 4/2015 |
| CN | 104575489 | A * | 4/2015 |
| CN | 106407993 | | 2/2017 |
| CN | 106940562 | | 7/2017 |
| CN | 107744370 | A | 3/2018 |
| WO | WO2018017499 | | 1/2018 |

OTHER PUBLICATIONS

First Office Action in CN application No. CN201980019807.0, dated Apr. 4, 2023, 10 pages.
First search in CN application No. CN201980019807.0, dated Apr. 4, 2023, 3 pages.
Second Office Action in CN application No. CN201980019807.0, dated Oct. 27, 2023, 9 pages.
European search opinion in EP application No. EP19788531.2 , dated Nov. 29, 2021, 5 pages.
International Search Report in application No. PCT/CN2019/083539 , dated Jun. 25, 2019, 2 pages.
Supplementary European search report in EP application No.No. EP19788531.2 , dated Nov. 29, 2021, 2 pages.
Written Opinion for related Application No. PCT/CN2019/083539 , dated Jun. 25, 2019, 3 pages.

* cited by examiner

SELF-MOVING DEVICE, SERVER, AND AUTOMATIC WORKING SYSTEM THEREOF

CROSS-REFERENCE TO RELATED APPLICATIONS

This application claims the benefit of and priority to U.S. patent application Ser. No. 17/048,566, filed on Oct. 16, 2020, which is a National Stage Application of International Application No. PCT/CN2019/083539, filed on Apr. 19, 2019, which claims the benefit of and priority to Chinese Patent Application No. 201810354642.X, filed on Apr. 19, 2018, all of which are hereby incorporated by reference in their entireties for all purposes as if fully set forth herein.

TECHNICAL FIELD

The embodiments of the present disclosure relate to a self-moving device, a server, and an automatic working system thereof.

BACKGROUND

A self-moving device is a type of robot that uses sensors to sense the ambient environment and the status of the self-moving device, understands and determines the complex environment, makes decisions and plans on this basis, and implements object-oriented movement, to accomplish a specific work task. The self-moving device can receive instructions inputted by a user to operate and can automatically operate according to a running program. The self-moving device may be used indoors or outdoors and applied to industry or homes. The self-moving device may replace security guards in patrols or replace people in floor cleaning. The self-moving device may further be used for family companionship and office work assistance, and is, for example, a vacuum cleaning robot or an autonomous lawn mower.

The self-moving device may recognize an object based on images shot by a camera apparatus disposed on the self-moving device, to perform an action based on the recognized object, for example, avoiding the obstacle and moving along the object.

SUMMARY

However, during actual application, no recognition technology can ensure perfect accuracy. Facing the complex real environment, a mobile robot may perform an incorrect action due to misrecognition and recognition miss. To eliminate the deficiencies above, the problem to be solved in embodiments of the present disclosure is to provide an automatic working system that accurately recognizes a working environment around a self-moving device in time.

In embodiments of the present disclosure, technical solutions adopted to solve the current technical problem areas follow:

An automatic working system includes:

a self-moving device, moving and working in a working area, and a server, communicating with the self-moving device;

the self-moving device includes:

an image detection module, detecting an environment around the self-moving device to generate an environmental image;

a first recognition module, recognizing a specific object in the image based on the environmental image to generate a first recognition signal;

a first communication module, communicatively connected to the server; and a control module, selectively controlling the first communication module to send the environmental image and/or the first recognition signal to the server; and the server includes:

a second recognition module, recognizing a specific object in the image based on the environmental image to generate a second recognition signal; and a second communication module, communicatively connected to the first communication module, receiving the environmental image and/or the first recognition signal, and sending the second recognition signal; and the control module controls an action of the self-moving device based on the first recognition signal and/or the second recognition signal.

In an embodiment, when the control module determines that the first recognition signal does not meet a preset condition, the controller controls the first communication module to send the environmental image to the server and receive the second recognition signal.

In an embodiment, the preset condition includes that the first recognition signal is generated within a first preset time.

In an embodiment, the preset condition includes that a confidence level of the first recognition signal is greater than a first preset value.

In an embodiment, when the control module determines that the first recognition signal does not meet the preset condition, the control module controls the self-moving device to enter a safe working mode to change the action of the self-moving device.

In an embodiment, when the first communication module is connected to the second communication module, the control module sends the environmental image and/or the first recognition signal to the server, and receives the second recognition signal.

In an embodiment, if the second recognition signal is received within a second preset time, the control module controls a movement pattern of the self-moving device based on the second recognition signal.

In an embodiment, if a confidence level of the first recognition signal is greater than a second preset value, the control module controls a movement pattern of the self-moving device based on the first recognition signal.

In an embodiment, the self-moving device includes a battery module, and the control module controls, based on that the state of charge of the battery module is less than a preset state of charge, a local communication module to be disconnected from the server.

In an embodiment, the control module sends an authorization request to user equipment, receives an authorization signal of the user equipment, and controls the local communication module based on the authorization signal to send a detection signal and/or a local recognition signal to the server.

In an embodiment, the specific object includes an obstacle, and the control module controls the self-moving device based on the obstacle to reverse or steer.

In an embodiment, the specific object includes a charging station, and the control module controls the self-moving device based on the charging station to move toward the charging station.

In an embodiment, the specific object includes a boundary of the working area, and the control module controls the self-moving device based on the boundary of the working area to move within the working area or along the boundary of the working area.

In an embodiment, the first recognition module invokes a preset first deep learning model, the second recognition module invokes a preset second deep learning model, and a quantity of model parameters of the second deep learning model is greater than that of the first deep learning model.

In an embodiment, the server includes a software update module, generating an update data packet based on the environmental image and/or the first recognition signal, and a communication module sends the update data packet to the self-moving device.

In an embodiment, the control module updates the first recognition module based on the update data packet.

In an embodiment, the first communication module includes a 5th generation mobile communication module or a mobile communication module with a maximum transmission speed greater than 1 Gbps.

In an embodiment, the environmental image includes an original image or a processed image.

In an embodiment, a technical solution adopted to solve the current technical problem is as follows:

A self-moving device moves and works in a working area, and includes:

an image detection module, detecting an environment around the self-moving device to generate an environmental image;

a first recognition module, recognizing a specific object in the image based on the environmental image to generate a first recognition signal;

a first communication module, selectively sending the environmental image and/or the first recognition signal to the server and receiving a second recognition signal corresponding to the environmental image; and a control module, controlling an action of the self-moving device according to the first recognition signal and/or the second recognition signal.

In an embodiment, when the control module determines that the first recognition signal does not meet a preset condition, the controller controls the first communication module to send the environmental image to the server and receive the second recognition signal.

In an embodiment, the preset condition includes that the first recognition signal is generated within a first preset time.

In an embodiment, the preset condition includes that a confidence level of the first recognition signal is greater than a first preset value.

In an embodiment, when the control module determines that the first recognition signal does not meet the preset condition, the control module controls the self-moving device to enter a safe working mode to change the action of the self-moving device.

In an embodiment, when the first communication module works normally, the control module sends the environmental image and/or the first recognition signal to the server, and receives the second recognition signal.

In an embodiment, if the second recognition signal is received within a second preset time, the control module controls a movement pattern of the self-moving device based on the second recognition signal.

In an embodiment, if a confidence level of the first recognition signal is greater than a second preset value, the control module controls a movement pattern of the self-moving device based on the first recognition signal.

In an embodiment, the specific object includes an obstacle, and the control module controls the self-moving device based on the obstacle to reverse or steer.

In an embodiment, the specific object includes a charging station, and the control module controls the self-moving device based on the charging station to move toward the charging station.

In an embodiment, the specific object includes a boundary of the working area, and the control module controls the self-moving device based on the boundary of the working area to move within the working area or along the boundary of the working area.

In an embodiment, the first communication module includes a 5th generation mobile communication module or a mobile communication module with a maximum transmission speed greater than 1 Gbps.

In an embodiment, the environmental image includes an original image or a processed image.

In an embodiment, a technical solution adopted to solve the current technical problem is as follows:

A server includes:

a second communication module, communicatively connected to a self-moving device, and receiving an environmental image sent from the self-moving device; and a second recognition module, recognizing a specific object in the image based on the environmental image to generate a second recognition signal, where the second communication module sends the second recognition signal to the self-moving device.

In an embodiment, the server includes a software update module, generating an update data packet based on the environmental image, and a communication module sends the update data packet to the self-moving device.

Compared with the conventional techniques, the beneficial effects of embodiments of the present disclosure are as follows. A relatively simplified image recognition algorithm is run by using hardware and software of a self-moving device to implement the recognition of basic features in an image. A relatively complex image recognition algorithm is run by using powerful hardware and software of a server to eliminate deficiencies of the image recognition algorithm of the self-moving device. Data transmission with low latency is implemented by using a high-speed communication module, thereby implementing efficient data transmission between the self-moving device and the server and ensuring that the self-moving device can obtain an accurate recognition result in time and perform an action accordingly.

To eliminate the deficiencies in the conventional techniques, an objective of embodiments of the present disclosure is as follows: A mobile robot is provided, including: a satellite signal receiving apparatus, receiving a satellite signal; and a communication module, receiving information from a 5G mobile base station, where the mobile robot implements precise positioning by using the received satellite signal and parsed signals sent by the 5G mobile base station as reference signals (differential corrections).

Another objective of embodiments of the present disclosure is that a mobile robot is provided, including: a satellite signal receiving apparatus, receiving a satellite signal; and a communication module, connected to a 5G mobile base station group in real time to obtain reference signals, and the mobile robot implements precise positioning by using the received satellite signal and parsed signals sent by the 5G mobile base station group as reference signals (differential corrections).

To achieve the foregoing objective, embodiments of the present disclosure use the following solutions:

a mobile robot, including a processing unit, a satellite signal receiving apparatus, and a communication module, where the processing unit is arranged in the mobile robot, and is electrically connected to the satellite signal receiving apparatus and the communication module;

the satellite signal receiving apparatus is configured to receive a satellite signal;

the communication module is connected to a 5G base station to receive information sent by the base station; and the processing unit parses a position reference signal according to the received information transmitted by the communication module and calculates position coordinates of the mobile robot in combination with the received satellite signal.

In an embodiment, the communication module is electrically connected to the processing unit, and during operation, the communication module is connected to the 5G base station to receive the information transmitted by the 5G base station and feed back the information to the processing unit.

In an embodiment, the communication module is integrated in the processing unit and electrically connected to the processing unit.

In an embodiment, the satellite signal receiving apparatus includes: an antenna, configured to receive the satellite signal; and a data processing module, arranged in the mobile robot, where the data processing module is electrically connected to the processing unit and processes the satellite signal.

In an embodiment, the antenna, disposed outside the mobile robot or attached to the surface of a housing of the mobile robot.

An embodiment of the present disclosure further provides a positioning system of a mobile robot, including the foregoing mobile robot and a 5G base station, where the mobile robot parses a reference signal based on a satellite signal received by a satellite signal receiving apparatus and information that is transmitted by the 5G base station and is received by a communication module, and calculates position coordinates of the mobile robot.

An embodiment further provides a positioning method of a positioning system of a mobile robot, including the foregoing mobile robot and a 5G base station, the method including the following steps:

S1, receiving a satellite signal by using a satellite signal receiving apparatus, and transmitting the received signal to a processing unit or a data processing module;

S2, exchanging information by connecting a communication module to the base station, and transmitting the received information sent by the base station to the processing unit or the data processing module;

S3, parsing, by the processing unit or the data processing module, a reference signal in the information based on the information transmitted by the base station; and S4, calculating, by the processing unit or the data processing module, position coordinates of the mobile robot according to the satellite signal and the parsed reference signal.

In an embodiment, the reference signal in step S3 is a differential correction.

In an embodiment, after step S4, the method further includes: controlling, by the processing unit of the mobile robot, the mobile robot according to the position coordinates to move.

An embodiment of the present disclosure further provides a positioning method of a positioning system of a mobile robot, including the foregoing mobile robot, and further including a plurality of 5G base stations, the method including the following steps:

S11, receiving a satellite signal by using a satellite signal receiving apparatus, and transmitting the received signal to a data processing module;

S12, receiving, by a communication module, information transmitted by a data processing center, and transmitting the information to the data processing module;

S13, parsing, by the data processing module based on the information transmitted by the data processing center, a reference signal in the information; and S14, calculating, by the data processing module, position coordinates of the mobile robot according to the satellite signal and the parsed reference signal.

In an embodiment, the reference signal in step S13 is a differential correction.

In an embodiment, after step S14, the method further includes: controlling, by a processing unit of the mobile robot, the mobile robot according to the position coordinates to move.

Compared with the conventional techniques, the present disclosure has beneficial effects as follows:

During operation, a mobile robot performs positioning by using a combination of a 5G communication base station and a satellite signal receiving apparatus. Specifically, information transmitted by the 5G communication base station is received in real time, and this location information is used as a reference signal. The reference signal and a signal from a satellite are received in real time, to perform quick and accurate positioning. The implementation solution is simple, cost effective, and easy to install and has high positioning accuracy, thereby improving working efficiency, reducing manual intervention, and improving user experience.

BRIEF DESCRIPTION OF THE DRAWINGS

The foregoing objectives, technical solutions, and beneficial effects of embodiments of the present disclosure can be achieved by using the following accompanying drawings.

DETAILED DESCRIPTION

Figure 1:
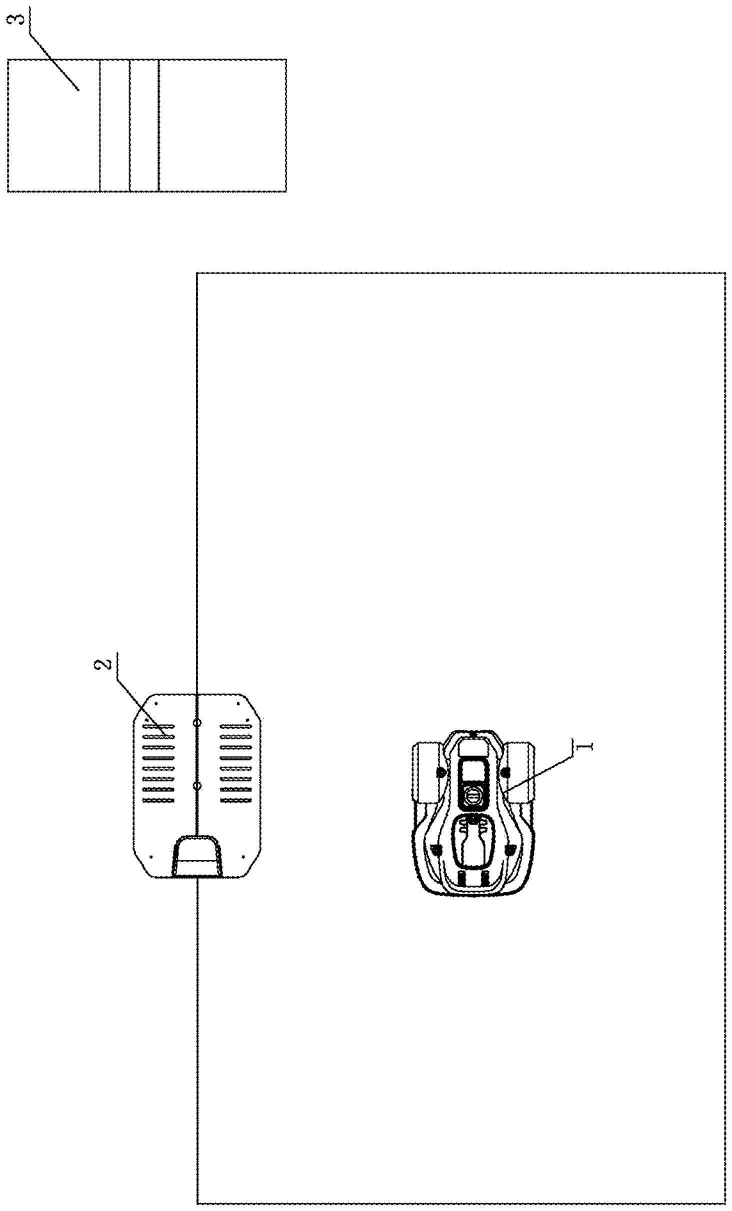
FIG. 1 is a schematic diagram of an automatic working system according to an example embodiment.

FIG. 1 is a schematic diagram of an automatic working system 100 according to an embodiment of the present disclosure. As shown in FIG. 1, the automatic working system includes a self-moving device and a server. In this embodiment, the self-moving device is an autonomous lawn mower 1. In another embodiment, the self-moving device may also be an unattended device including an automatic cleaning device, an automatic irrigation device, and an automatic snowplow. The automatic working system further includes a server 10, capable of communicating with an autonomous lawn mower 1, and providing functions such as storage and computing. The automatic working system 100 further includes a charging station 2, configured to recharge the autonomous lawn mower 1.

Figure 2:
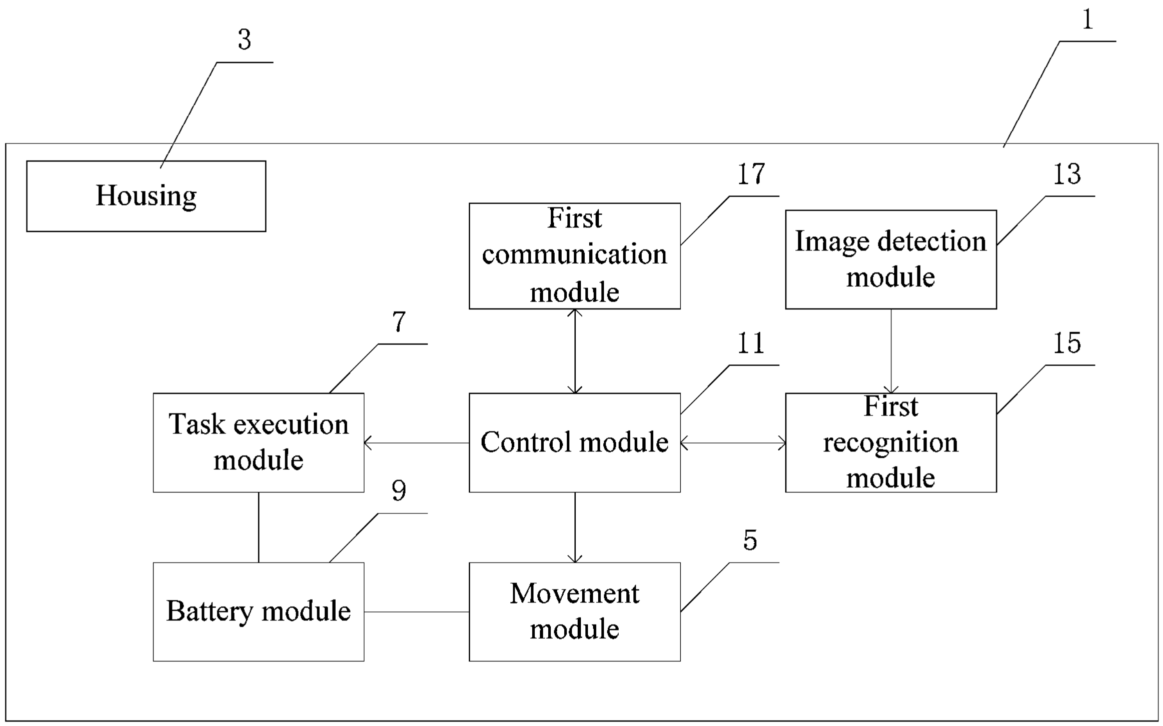
FIG. 2 is a schematic structural diagram of a self-moving device according to an example embodiment.

FIG. 2 is a schematic structural diagram of the autonomous lawn mower 1 according to an embodiment of the present disclosure. As shown in FIG. 2, in this embodiment, the autonomous lawn mower 1 includes: a housing 3; a movement module 5, mounted in the housing 3, and driving the autonomous lawn mower 1 to move; and a task execution module 7, mounted at the bottom of the housing 3, and including a cutting component to perform cutting work. The autonomous lawn mower 1 further includes an energy module, supplying energy to the autonomous lawn mower 1 to move and work. In this embodiment, the energy module is a battery module 9. The autonomous lawn mower 1 further includes a control module 11, electrically connected to the movement module 5, the task execution module 7, and the energy module. The control module 11 controls the movement module 5 to drive the autonomous lawn mower 1 to move and controls the task execution module 7 to perform a work task. The autonomous lawn mower 1 further includes an image detection module 13, mounted in the housing 3, and detecting images in a surrounding area of the autonomous lawn mower 1 and outputting environmental image. The autonomous lawn mower 1 further includes a first recognition module 15, receiving the environmental image outputted by the image detection module 13. The first recognition module 15 recognizes a specific object in the image and generates a first recognition signal. The control module 11 controls the movement module 5 based on the first recognition signal, and controls an action of the self-moving device 1 according to different working scenarios. The autonomous lawn mower 1 further includes a first communication module 17, communicatively connected to the server 10.

Figure 3:
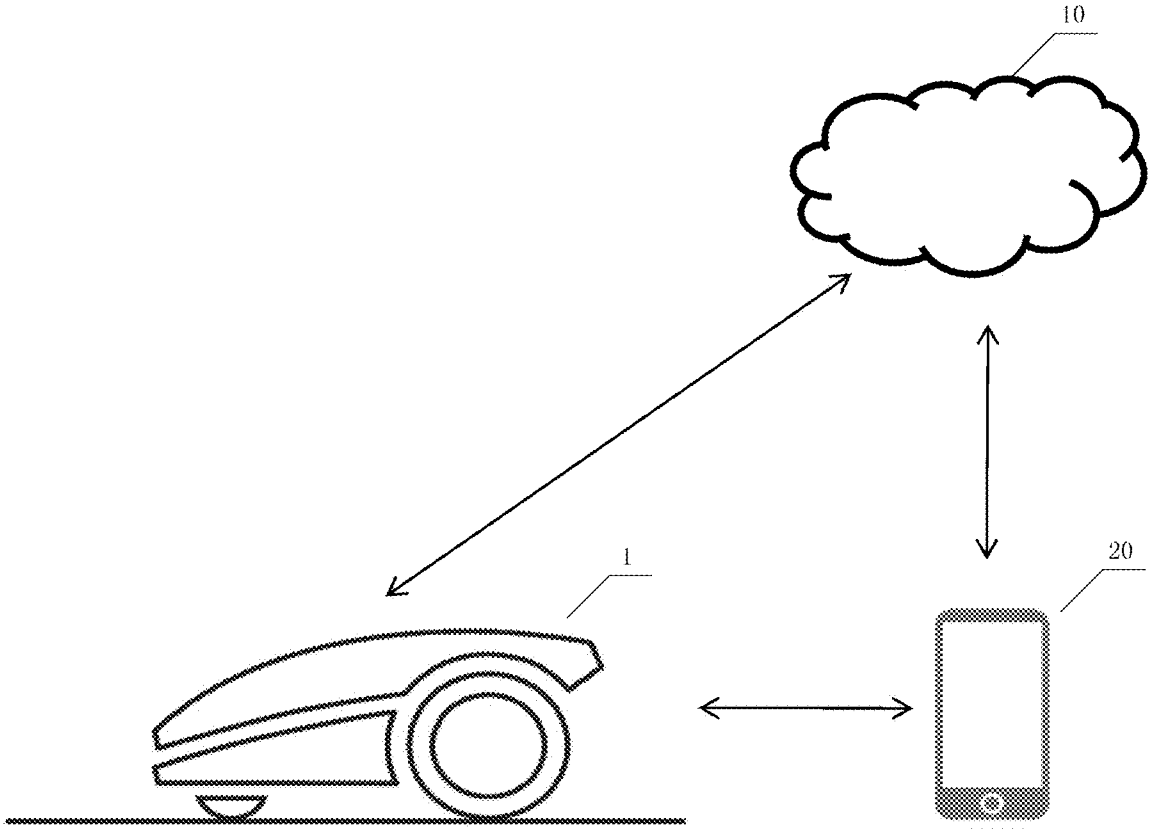
FIG. 3 is a schematic diagram of a working system according to an example embodiment.

FIG. 3 is a schematic diagram of a working system according to an embodiment of the present disclosure. As shown in FIG. 3, in this embodiment, the server is a server based on a cloud architecture. In another embodiment, the server 10 may be alternatively a physical server such as a single server, a server cluster or a distributed server. The autonomous lawn mower 1 may communicate with user equipment 20 by using the first communication module 17 or in another communication manner to implement secondary monitoring on the autonomous lawn mower 1. The server 10 may further communicate with the user equipment 20, and directly transmit an operation result of the server 10 to a user.

Figure 4:
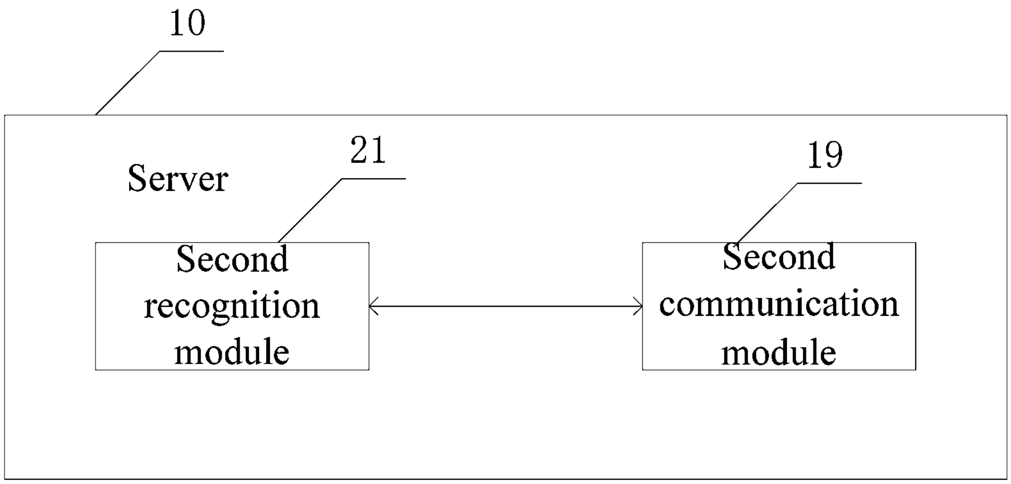
FIG. 4 is a schematic structural diagram of a server according to an example embodiment.

FIG. 4 is a schematic structural diagram of a server 10 according to an embodiment of the present disclosure. As shown in FIG. 4, in this embodiment, the server 10 includes a second communication module 19, communicatively connected to the first communication module 17, and receiving the environmental image or other signals sent by the first communication module 17. The server 10 further includes a second recognition module 21. The function of the second recognition module 21 is basically the same as that of the first recognition module 15. The second recognition module 21 recognizes the specific object in the image based on the environmental image, generates a second recognition signal, and sends the second recognition signal to the autonomous lawn mower 1 by using the second communication module 19. Differences lie in that the operation speed of the second recognition module 21 is faster than that of the first recognition module 15. Therefore, the second recognition module 21 can invoke a more complex image recognition algorithm and provide a recognition result with faster speed and higher precision.

In an embodiment, the image detection module 13 includes a camera apparatus. The self-moving device 1 performs related operations according to the image shot by the camera apparatus. In another embodiment, there may be a plurality of camera apparatuses. In another embodiment, the camera apparatus can shoot static images at different moments at specific time intervals. In another embodiment, the camera apparatus can shoot a video. Because the video is formed by image frames, through continuous or discontinuous acquisition of the obtained image frames in the video, a frame of image may be selected as an image. In this embodiment, the image detection module 13 can directly output an original image. In another embodiment, the image detection module 13 further includes a compression device, a clipping device or the like, preliminarily processing the original image and outputting a processed image.

In an embodiment, the first communication module 17 includes a 5G communication module. Compared with the 4G technology, the user bandwidth may be up to 1 Gbps (1024 Mbps) in a 5G design standard, which is 30 times the user bandwidth in current 4G, and has a more uniform data transfer rate, lower latency, and a lower unit cost. Currently, the average latency of the state-of-the-art 4G LTE is about 90 milliseconds, and the average latency of a conventional wired network is about 50 milliseconds to 120 milliseconds. However, the target latency of 5G is within 10 milliseconds. A design objective of the target latency of 5G is one fiftieth that of 4G, and is much less than that of a current conventional wired network.

In an embodiment, the first communication module 17 includes large-scale input/output antenna units. A quantity of input antennas in the large-scale input/output units is greater than or equal to 2, and a quantity of output antennas is greater than or equal to 2. In an embodiment, the quantity of the input antennas of the large-scale input/output antenna units is 4, and the quantity of the output antennas is 4. Generally, a 2-receive 2-transmit base station and a 2-receive 2-transmit antenna equipment support 2*2 MIMO. In this embodiment, a 4-transmit 4-receive self-moving device of the base station performs 4-transmit 4-receive, and has four concurrent data flows, that is, 4*4 MIMO, of which the speed doubles that of 2*2 MIMO. A layout form of the antennas in the large-scale input/output units is an antenna array. The antennas receive and send signals independently and ensure a correlation that is low enough between each other. In addition, each antenna has an absolutely isolated data flow, thereby receiving and sending the data flow efficiently.

In an embodiment, the first recognition module 15 includes a first storage unit and a first operation unit. The first storage unit has a first deep learning model. Based on the environmental image outputted by the image detection module 13, the first operation unit invokes the first deep learning model to perform an operation and output the first recognition signal. The success rate of image recognition is affected by two major factors: first, the design of a recognition algorithm model; and second, the scale of a recognition algorithm training set (a quantity of images used for training and recognizing the model. The increase in the complexity of the recognition algorithm model, for example, the increase in the quantity of layers of convolution and the increase in the quantity of nodes of a neural network, facilitates the increase in the recognition accuracy. However, the increase in the complexity of the algorithm model may lead to a higher requirement on the operation capability. When the training set scale is larger, the training effect is better, and the trained recognition algorithm has a higher success rate. To improve the success rate, the training set needs to be as large as possible in the practical engineering application. However, when costs and time are taken into consideration, the training set scale in the first recognition module 15 of the autonomous lawn mower 1 is relatively small. To support the requirement of a deep algorithm, the first deep model needs to be optimized. For example, the quantity of layers of convolution or the quantity of neural nodes needs to be controlled. Because the image recognition requires massive computing, when the device is not supported by a powerful server, restricted by hardware and software resources of the autonomous lawn mower 1, the first recognition module 15 is prone to recognition errors, slow recognition speed and even freezes. In this embodiment, the second recognition module 21 receives the environmental image, and invokes the second deep learning model stored in the second recognition module 21 to perform an operation to input the second recognition signal. It may be understood that an operation scale of the second deep learning model is larger than that of the first deep learning model, and the algorithm model is more complex than the first deep learning model.

In an embodiment, to ensure a sufficient success rate of recognition, the first recognition module 15 includes a central processing unit (CPU), and further includes a graphics processing unit (GPU) or a digital signal processing unit (DSP), to provide a sufficient floating-point arithmetic capability. In another embodiment, the first recognition module 15 includes a CPU, and further includes a dedicated neural network processing unit (NPU), directly providing neural network operation with optimized operation support.

In an embodiment, the first recognition module 15 includes software programs of image recognition methods such as the image recognition algorithm based on the neural network and the image recognition algorithm based on wavelet moments, to process, analyze, and recognize the taken images and further obtain an object region of a corresponding object category in the image. The object region may be represented by features such as the grayscale of an object and the contour of the object. For example, a method for representing the object region by using the contour of the object includes obtaining the recognized object region by using a contour extraction method. The contour extraction method includes, but is not limited to, methods such as a binary method, a grayscale method, and a canny operator method. Next, the object having an object category label labeled in advance and the object region in the image, correspondence of content, features, structures, relationships, textures and grayscales between the object and the image, similarity and consistency are analyzed to seek a similar image target, so that the object region in the image corresponds to the object category labeled in advance. In an embodiment, the first recognition module 15 includes a neural network model (for example, a CNN) that is obtained by training in advance, and the first recognition module 15 recognizes the object region corresponding to each of the object categories in the image by performing the neural network model.

In an embodiment, the specific object recognized by the first recognition module 15 includes an obstacle. For the autonomous lawn mower 1, categories of the obstacles include, but are not limited to, a charging station, a flower bed, a tree, another garden tool, and a pet. When the autonomous lawn mower 1 is working normally and the first recognition module 15 recognizes an obstacle, the control module 11 may perform obstacle avoidance according to the first recognition signal. Specifically, the autonomous lawn mower 1 may pause, reverse or steer. In an embodiment, the first recognition module 15 may recognize categories of different obstacles. The control module 11 performs obstacle avoidance according to the different categories of the obstacles. For example, the obstacle includes a flower bed and a tree. To reach the edge of the obstacle to cut grass, the control module 11 reduces the execution standards of the obstacle avoidance. For example, the control module 11 only controls the movement module 5 to slow down. For a pet and a human body, the control module 11 may increase the execution standards of the obstacle avoidance. For example, the control module 11 controls the movement module 5 to reverse and controls the task execution module 7 to stop at the same time, to ensure that the pet and the human body are unharmed, thereby improving the safety of operating the autonomous lawn mower 1.

In an embodiment, the specific object recognized by the first recognition module 15 includes a boundary of the working area. The working area of the autonomous lawn mower 1 is a lawn, and the boundary of the working area is a non-lawn area. The working area and is distinguished from a non-working area by using the lawn and the non-lawn area.

In an embodiment, the first recognition module 15 recognizes a lawn/a non-lawn area in an image. The control module 11 controls the autonomous lawn mower 1 to move on the lawn. When detecting that a non-lawn area appears in the image or in a position of the image, the control module 11 controls the movement module 5 to reverse or steer. Specifically, a mounting position of the image detection module 13 determines an image recognized by the first recognition module 15, and correspondingly affects a control manner of the control module 11. For example, the image detection module 13 detects the ground in front of the autonomous lawn mower 1. If the ground position detected by the image detection module 13 is relatively close to the autonomous lawn mower 1, the control module 11 needs to respond to the first recognition signal outputted by the first recognition module 15 faster, and controls the movement module 5 to reverse and steer. If the ground position detected by the image detection module 13 is relatively away from the autonomous lawn mower 1, after receiving the first recognition signal, the control module 11 may determine whether to control the movement module 5 to move forward or to control the movement module 5 to change a movement direction.

In an embodiment, the first recognition module 15 recognizes a lawn/a non-lawn area in the image. The control module 11 determines a position of the autonomous lawn mower 1 relative to the boundary of the working area through the first recognition signal, and may control the movement module 5 to move along the boundary of the working area, so that the autonomous lawn mower 1 reaches the boundary of the working area to cut grass, or returns along the boundary of the working area. Specifically, the control module 11 may control the autonomous lawn mower 1 to move along an inner boundary of the working area, or control the autonomous lawn mower 1 to be partially located inside the working area and partially located outside the working area, or control the autonomous lawn mower 1 to move along an outer boundary of the working area.

In an embodiment, the specific object recognized by the first recognition module 15 includes a charging station 2. When the autonomous lawn mower 1 is in a return mode, the control module 11 controls the movement direction of the movement module 5 according to the charging station 2 recognized by the first recognition module 15, to enable the self-moving device 1 to move toward the charging station 2, thereby implementing the return of the self-moving device 1 to the charging station 2. In another embodiment, the first recognition module 15 can recognize the charging station 2, and can also recognize a marker on the charging station 2 or a docking terminal of the charging station 2. The control module 11 controls the movement direction of the movement module 5 according to the docking terminal of the charging station 2 recognized by the first recognition module 15, to enable the self-moving device 1 to be docked to the charging station 2.

In an embodiment, normally, the first communication module 17 communicates with the second communication module 19 normally. When the autonomous lawn mower 1 is working, the image detection module 13 acquires images and outputs an environmental image. The first recognition module 15 performs recognition based on the environmental image and outputs a first recognition signal. The control module 11 performs control based on the first recognition signal. However, due to the restrictions of the operation capability and recognition accuracy of the first recognition module 15, a number of recognition errors may occur or the recognition speed may be excessively slow. For some objects, because there are differences in factors such as the angle of view, environment, light, and deformation, recognition may fail. Therefore, in this embodiment, one preset condition is set for the first recognition module 15. If the first recognition signal meets the preset condition, the control module 11 performs control based on the first recognition signal. If the first recognition signal does not meet the preset condition, the environmental image is sent to the server 10 and is recognized by the second recognition module 21.

In an embodiment, a confidence level of the first recognition signal outputted by the first recognition module 15 is calculated. If the confidence level is greater than a first preset value, the control module 11 performs control according to the first recognition signal. If the confidence level is less than the first preset value, the control module 11 controls the first communication module 17 to send the environmental image to the second communication module 19. The second recognition signal is recognized and outputted by the second recognition module 21, and is sent by the second communication module 19 to the first communication module 17. The control module 11 performs control according to the second recognition signal.

In an embodiment, the operation time of the first recognition module 15 is counted. The control module 11 includes a timer. When the image detection module 13 sends the environmental image to the first recognition module 15, the timer starts timing. If the image detection module 13 has not sent the first recognition signal yet when the time of the timer exceeds a first preset time, the control module 11 controls the first communication module 17 to send the environmental image to the second communication module 19. The second recognition signal is recognized and outputted by the second recognition module 21, and is sent by the second communication module 19 to the first communication module 17. The control module 11 performs control according to the second recognition signal. Therefore, delayed response caused by restrictions of hardware or software of the first recognition module 15 is avoided.

In an embodiment, to prevent danger caused when the autonomous lawn mower 1 fails to recognize a target object in time, if the first recognition signal does not meet the preset condition, the control module 11 controls the autonomous lawn mower 1 to enter a safe working mode. In the safe working mode, a working manner of the autonomous lawn mower 1 may be set according to a practical requirement. The movement module 5 may be controlled to reduce the movement speed or stop moving, the movement module 5 may also be controlled to reverse or steer, and the task execution module 7 may also be controlled to stop working.

In an embodiment, when the autonomous lawn mower 1 is working, the image detection module 13 acquires images and outputs an environmental image. The first recognition module 15 performs recognition based on the environmental image and outputs the first recognition signal. At the same time, the first communication module 17 sends the environmental image to the second communication module 19, and receives the second recognition signal outputted by the second recognition module 21. The control module 11 may first select the second recognition signal to control the autonomous lawn mower 1 to improve the recognition accuracy of the environmental image. Because the autonomous lawn mower 1 and the server 10 are connected in a wireless communication manner, there is a possibility of disconnection. In an embodiment, the control module 11 starts timing from a moment at which the first communication module 17 sends the environmental image. If the second recognition signal is not received within a second preset time, the control module 11 performs control based on the first recognition signal. In another embodiment, a confidence level of the first recognition signal outputted by the first recognition module 15 is calculated. If the confidence level is greater than a second preset value, the control module 11 performs control according to the first recognition signal. In another embodiment, according to the hardware capability and the software complexity of the autonomous lawn mower 1, parameters including the receiving time of the second recognition signal, the confidence level of the first recognition signal, and the operation time of the first recognition signal may all be taken into consideration, thereby ensuring the accuracy of recognition based on that the control module 11 can respond to the environmental image in time.

In an embodiment, when the state of charge of the battery module 9 is less than a preset state of charge, the first communication module 17 is controlled to stop working, thereby reducing power consumption. Because the first communication module 17 has a high transmission rate, the power consumption of the first communication module 17 is greater than that of a conventional communication module. When the first communication module 17 stops working, the success rate that the autonomous lawn mower 1 returns to the charging station 3 for charging can be improved, and the battery module 9 can also be protected, thereby preventing the service life of the battery module 9 from being affected due to exhaustion of power.

In an embodiment, as shown in FIG. 3, in some scenarios, some users may want to avoid sending image information to a server for the sake of privacy. Based on the above, before the control module 11 sends the environmental image to the server 10, user authorization needs to be obtained. If the environmental image is authorized by a user, the control module 11 may control the first communication module 17 to send the environmental image to the server 10. If the environmental image is not in an authorization range, the control module 11 cannot control the first communication module 17 to send the environmental image to the server 10. In this embodiment, the first communication module 17 is communicatively connected to the user equipment 20. When the autonomous lawn mower 1 starts to work, the control module 11 sends an authorization request to the user equipment 20. The first communication module 17 can send the environmental image only after the control module 11 needs to receive an authorization signal sent by the user equipment 20. In another embodiment, the authorization signal can include authorization for a specific time or a specific scenario. The control module 11 sends the environmental image according to the authorization range of the authorization signal.

Figure 5:
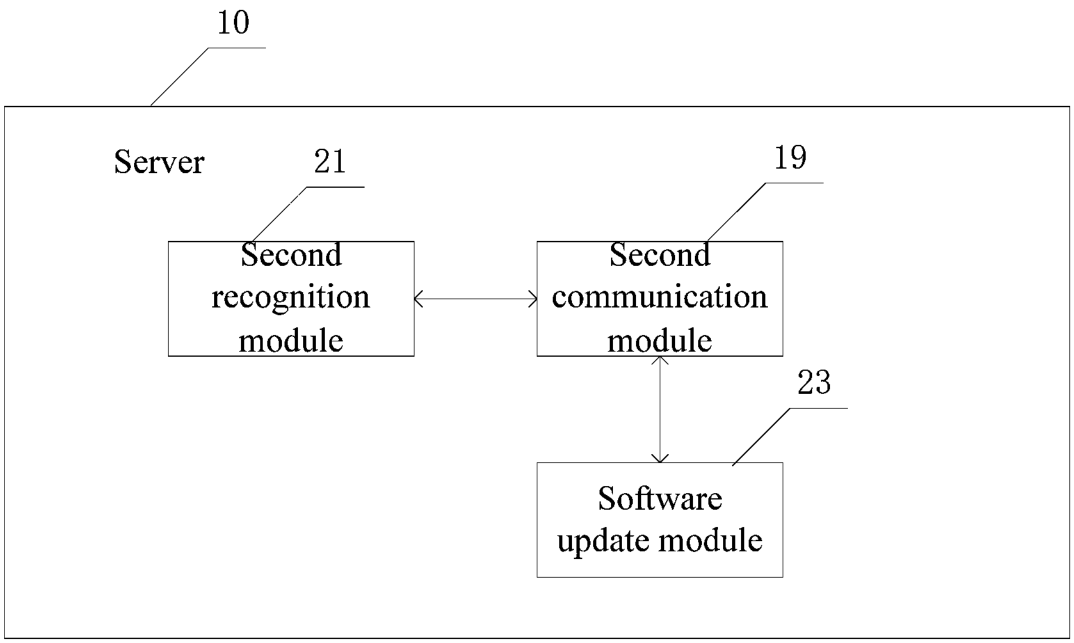
FIG. 5 is a schematic structural diagram of a server according to an example embodiment.

FIG. 5 is a schematic structural diagram of a server 10 according to an embodiment of the present disclosure. As shown in FIG. 5, in an embodiment, the server 10 includes a software update module 23, training software programs of the first recognition module based on the environmental image received by the second communication module 19 and the first recognition signal. Training methods include, but are not limited to, adjusting intrinsic parameters of the software programs and configuration information of the software programs. In this embodiment, the first recognition module 15 invokes a deep learning model. A training process of deep learning needs to be supported by massive data and maintains relatively high flexibility. The server 10 has powerful computing resources and can effectively extract corresponding training parameters. For example, the software programs include network structures and connection manners of the neural network model. A back-propagation algorithm is used to train the parameters in the neural network model, so that the accuracy of the neural network model is improved and the software update module 23 may encapsulate the parameters in the trained neural network model into an update data packet.

The update data packet may include a service pack applied to the software and a data packet required for software update. For example, in an embodiment, a first software program or a second software program includes the network structure and the connection manner of the neural network model. Correspondingly, the update data packet includes the parameters in the corresponding neural network. For example, in a case that the first software program or the second software program is executed by using a CNN, the update data packet obtained by training and updating the first software program or the second software program includes related parameters such as weight parameters and offset parameters in the corresponding CNN.

In an embodiment, the first recognition signal and the second recognition signal corresponding to the same environmental image are compared, so that the level of a first recognition algorithm model is evaluated in a relatively objective manner, particularly in a case that recognition accuracy for an object or recognition accuracy for an object in a specific scenario is relatively low. The comparison can be accomplished at the end of the autonomous lawn mower 1 or accomplished on the server 10. The server 10 may perform training for a comparison result, and a manufacturer may be reminded to perform optimization, thereby improving the first recognition algorithm model.

In an embodiment, the self-moving device includes a processing unit, a positioning module and a communication module. The processing unit is arranged inside the self-moving device and electrically connected to the positioning module and the communication module. The positioning module includes a satellite signal receiving apparatus for receiving a satellite signal. The communication module is connected to a base station to receive information of the base station. The processing unit parses a position reference signal according to the received information transmitted by the communication module and combines the received satellite signal to calculate position coordinates of the self-moving device (that is, performing positioning on the self-moving device).

In the foregoing implementation, the satellite signal receiving apparatus includes an antenna (In an embodiment, arranged outside the self-moving device), and a data processing module (disposed on a high-precision positioning board card), arranged in the self-moving device, and electrically connected to the processing unit.

The communication module is compatible with a mobile network (for example, a 4G mobile network and a 5G mobile network), and is electrically connected to the processing unit. In an embodiment, the communication module is arranged in the self-moving device in a pluggable manner. During running, the communication module is connected to a nearby mobile 5G base station, receives information transmitted by the base station, and feeds back the information to the processing unit. Communication cards such as a standard SIM card, a micro SIM card, and a nano SIM card are disposed in the communication module. In an implementation, the communication module is mounted in the self-moving device in a pluggable manner. In an implementation, the communication module is integrated in the processing unit. In this case, the communication module is disposed in the processing unit according to a specific rule without an extra standard SIM card, micro SIM card or nano SIM card, thereby reducing the volume of the processing unit and improving the stability.

The processing unit parses the reference signal in the information based on a specified reading algorithm according to the received information transmitted by the communication module, uses the reference signal as a differential signal, and combines the signal transmitted by the satellite signal receiving apparatus to calculate the (current) position coordinates of the self-moving device (that is, to perform the positioning on the self-moving device). Therefore, the requirements of the self-moving device are adequately satisfied.

The base station is a 5G-based mobile base station. The base station functions as a radio transceiver station that transfers information between a mobile communication switch center and a mobile phone terminal and has a (GPS-based) positioning and timing function. In this case, usually, the base station further includes a high-precision satellite antenna, and the antenna receives satellite information by using a dual-frequency mode (different from a conventional single-frequency mode).

In an embodiment, the self-moving device includes a body, a satellite signal, a receiving apparatus, and a communication module.

The satellite signal receiving apparatus includes an antenna used for receiving the satellite signal and a data processing module arranged in the body to receive and process the satellite signal.

The communication module is electrically connected to the data processing module, to receive the information transmitted by the base station (5G base station) and transmit the information to the data processing module. The data processing module receives the information transmitted by the base station and parses a correction and combines the satellite signal received by the antenna to calculate the position coordinates (that is, current position information) of the self-moving device. The processing unit of the self-moving device controls the self-moving device according to the position coordinates to move.

In an implementation, the antenna of the satellite signal receiving apparatus is mounted in the self-moving device in a pluggable manner. Therefore, in an idle state, the antenna can be removed to facilitate the storage of the self-moving device.

In an implementation, the data processing module is disposed on the high-precision positioning board card and electrically connected to the processing unit. Components of the processing unit are arranged on a circuit board through a layout.

In an implementation, the high-precision positioning board card is integrated in the processing unit. The components of the processing unit are arranged on a circuit board through the layout.

In an implementation, the self-moving device has an external port, configured to mount the communication module. If the communication module needs to be replaced, a user can buy and mount a matching module.

In an implementation, the data processing module (disposed on the high-precision positioning board card) supports dual-antenna input, and supports three-system (BDS B1/B2, GPS L1/L2, and GLONASS G1/G2) dual-frequency signals. During data exchange, the data processing module supports data in formats such as the standards NMEA-0183 GPGGA, GPGGARTK, GPGSV, GPGLL, GPGSA, GPGST, GPHDT, GPRMC, GPVTG, GPZDA, and the like; CMR (GPS) CMROBS, CMRREF, RTCM2.X RTCM1, RTCM3, RTCM9, RTCM1819, RTCM31, RTCM59; RTCM3.0 1004, 1005, 1006, 1007, 1008, 1011, 1012, 1104, 1033, RTCM3.2 MSM4 & MSM5 1074, 1084, 1124, 1075, 1085, 1125.

The connection between the self-moving device and a single 5G base station is used as an example for description. The self-moving device uses the satellite signal received by the satellite signal receiving apparatus thereof, and uses the communication module that is connected to the base station and exchanges information with the base station, to obtain position information of the mobile base station, and uses the message as a differential correction to calculate the position coordinates (the current position information) of the self-moving device. Therefore, in this embodiment, it is no necessary to establish a base station as a reference station, thereby greatly reducing system costs.

To resolve the foregoing problem, it is proposed that a signal network having a larger coverage area than that of CORS is a cellular communication base station network.

During practical application, a plurality of 5G mobile base stations are arranged in a region, and include a series of cellular base stations. The cellular base stations divide the entire communication region into cellular cells. A cellular wireless networking manner is used to connect the terminal and the network equipment by a radio channel.

In an embodiment, a plurality of mobile base stations are established in a region. For example, there are usually three or more base stations. The base stations include a first reference base station, a second reference base station, a third reference base station and a data processing center. A particular distance (for example, 50 kilometers to 1005 kilometers) is kept between the reference base stations. The data processing center integrates data of an entire network of the reference base stations by combining a network RTK algorithm, to perform an operation to simulate a virtual base station (VRS) (<1 m) near the self-moving device and calculate a more precise reference signal (a differential correction), thereby implementing the high-precision positioning of the self-moving device. In this implementation, the data processing center exchanges information with a self-moving device 0. A 5G-based mobile network is used for a transmission mode between the reference base stations in a mobile base station group and the self-moving device. In this implementation, the arrangement of the self-moving device is the same as that in the solution described in FIG. 1 to FIG. 3. The first reference base station, the second reference base station, the third reference base station, and the second reference base station are all 5G base stations.

A positioning method of the self-moving device is described in the following. The positioning method in which the self-moving device is connected to the single 5G base station includes the following steps:

S1, receiving a satellite signal by using a positioning module, and transmitting the satellite signal to a processing unit or a data processing module.

S2, receiving information sent by the base station by connecting a communication module to the 5G base station, and transmitting the information to the processing unit or the data processing module;

S3, parsing, by the processing unit or the data processing module, a reference signal in the information based on the information transmitted by the base station; and S4, calculating, by the processing unit or the data processing module, position coordinates of the self-moving device according to the satellite signal and the parsed reference signal.

In an implementation, step S1 further includes: performing noise reduction and filtering on the received satellite signal.

In an implementation, step S2 further includes: exchanging, by the communication module, information with the data processing center through a mobile network.

In an implementation, in step S3, the data processing module reads the reference signal in the information based on a specified reading algorithm.

In an implementation, in step S3, the data processing module reads the reference signal in the information based on the specified reading algorithm and uses the reference signal as a differential correction.

In an implementation, after step S4, the method further includes: controlling, by the processing unit of the self-moving device, the self-moving device according to the position coordinates to move.

In the foregoing implementations, the satellite signal may be a navigation positioning signal such as a GPS signal, a Beidou navigation signal, a European Galileo signal and a Russian GLONASS signal. The communication module exchanges information with the 5G mobile base station. The information is transmitted to the processing unit or the data processing module. The processing unit or the data processing module reads position information in the information according to the specified algorithm and uses the position information as a differential signal. The processing unit of the self-moving device controls the self-moving device according to the position coordinates to move.

A positioning method of the self-moving device is described below. The positioning method in which the self-moving device is connected to a plurality of 5G base station groups includes the following steps:

S11, receiving a satellite signal by using a satellite signal receiving apparatus, and transmitting the received signal to a data processing module;

S12, receiving, by a communication module, information transmitted by a data processing center, and transmitting the information to the data processing module;

S13, parsing, by the data processing module based on the information transmitted by the data processing center, a reference signal in the information; and S14, calculating, by the data processing module, position coordinates of the self-moving device according to the satellite signal and the parsed reference signal.

In an implementation, step S11 further includes: performing noise reduction and filtering on the received satellite signal.

In an implementation, step S12 further includes: exchanging, by the communication module, information with the data processing center through a mobile network.

In an implementation, in step S13, the data processing module reads the reference signal in the information based on a specified reading algorithm.

In an implementation, in step S13, the data processing module reads the reference signal in the information based on the specified reading algorithm and uses the reference signal as a differential correction.

In an implementation, after step S14, the method further includes: controlling, by the processing unit of the self-moving device, the self-moving device according to the position coordinates to move.

In an implementation, a communication module is arranged inside the self-moving device. A 5G communication module is integrated in the communication module (the module uses a downward compatibility manner to be compatible with 3G and 4G). During working, the communication module establishes a connection with the base station to exchange information. The signal transmitted by the base station is received, and position information in the signal is parsed and is used as a reference signal.

It should be noted that in an implementation, for a self-moving device, in a "satellite signal receiving apparatus", a "communication module", a "5G base station", and a "5G base station group", one or more technical features may be included. Content related to the "satellite signal receiving apparatus" may be selected from one or a combination of the related technical features included in the implementations, content related to the "communication module" may be selected from one or a combination of the related technical features included in the implementations, content related to the "mobile base station" may be selected from one or a combination of the related technical features included in the implementations, and content related to the "5G base station group" may be selected from one or a combination of the related technical features included in the implementations.

In a design of the self-moving device, the self-moving device is provided with at least one battery pack. The battery pack may be disposed inside the self-moving device. For example, one battery pack is used. The battery pack is disposed as close as possible to the center of gravity of the self-moving device, to improve the stability during working. When two battery packs are used (the two battery packs may be electrically connected in series or electrically connected in parallel), the battery packs are disposed as close as possible to a central region of the self-moving device (from the perspective of projecting the tool to the ground from the top) to improve stability during working.

In a design of the satellite signal receiving apparatus, the satellite signal receiving apparatus includes an antenna, configured to receive a satellite signal, and a data processing module (the data processing module is disposed on a high-precision positioning board card) is arranged in the self-moving device to receive the signal received by the antenna, and combines a reference signal transmitted by the communication module to perform positioning on current position coordinates of the self-moving device.

The antenna is disposed outside the self-moving device and fixed to the self-moving device. In a design of the satellite antenna, the satellite antenna is attached to the surface of a housing of the self-moving device in the form of a patch.

In a design of the connection module, the communication module is compatible with a mobile network (for example, a 4G network or a 5G network). During running, the communication module is connected to a nearby base station, receives information transmitted by the base station, and feeds back the information to the processing unit. In an embodiment, communication cards such as a standard SIM card, a micro SIM card, and a nano SIM card are disposed in the communication module. In an embodiment, the communication module is mounted in the self-moving device or integrated in the processing unit in a pluggable manner.

In a design of the mobile base station, the 5G base station functions as a radio transceiver station that transfers information between a mobile communication switch center and a mobile phone terminal and has a (GPS-based) positioning and timing function. In this case, usually, the base station includes a high-precision satellite antenna, and the antenna receives satellite information by using a dual-frequency mode (different from a conventional single-frequency mode).

In a design of the mobile base station group, a region includes a plurality of 5G mobile base stations. A reference station that runs continuously is formed by the base stations in a networking manner.

In a design of the battery pack, a maximum voltage of the battery pack may be 12 V, 16 V, 20 V, 24 V, 40 V, and 60 V. A specific voltage depends on an application scenario of the self-moving device. This is not limited herein. A battery chip inside the battery pack may be a lithium-based battery, a fuel cell or the like.

In the foregoing implementations, the self-moving device may be a lawn mower, a cleaning machine, a snowplow or the like. In an embodiment, the lawn mower, the cleaning machine, and the snowplow have a function of planning a path automatically.

That is, the foregoing features may be arranged or combined in any manner and used for improving the self-moving device.

The foregoing described implementations are merely several implementations of embodiments of the present disclosure. Word descriptions have limitations while infinite possible structures exist objectively. A person of ordinary skill in the art may make several improvements or modifications without departing from the principle of embodiments of the present disclosure, and the improvements or modifications shall fall within the protection scope of embodiments of the present disclosure. Therefore, the protection scope of the patent of the present disclosure is subject to the appended claims.

What is claimed is:

1. An automatic working system comprising:

a self-moving device; and a server configured to communicate with the self-moving device, wherein the self-moving device includes:

an image detection module configured to detect an environment around the self-moving device to generate an environmental image;

a first recognition module configured to recognize a specific object in an image based on the environmental image to generate a first recognition signal;

a first communication module communicatively connected to the server; and a control module configured to selectively control the first communication module to send at least one of the environmental image or the first recognition signal to the server; wherein the server includes:

a second recognition module configured to recognize the specific object in the image based on the environmental image to generate a second recognition signal; and a second communication module, communicatively connected to the first communication module, configured to receive at least one of the environmental image or the first recognition signal, and send the second recognition signal;

wherein the control module controls an action of the self-moving device based on at least one of the first recognition signal or the second recognition signal, including:

determining that the first recognition signal is not received within a preset time, and in response to the first recognition signal being not received within the preset time, controlling the first communication module to send the environmental image to the server and receive the second recognition signal generated based on the environmental image, wherein the preset time is measured from when the image detection module transmits the environmental image to the first recognition module.

2. The automatic working system according to claim 1, wherein the control module is further configured to send an authorization request to a user equipment, receive an authorization signal sent by the user equipment, and control the first communication module based on the authorization signal to send the environmental image and/or the first recognition signal to the server.

3. The automatic working system according to claim 2, wherein the self-moving device further includes a battery module.

4. The automatic working system according to claim 3, wherein the control module is further configured to control, based on that a state of charge of the battery module is less than a preset state of charge, the first communication module to be disconnected from the server.

5. The automatic working system according to claim 1, wherein when the first communication module is connected to the second communication module, the control module sends the environmental image and/or the first recognition signal to the server, and receives the second recognition signal.

6. The automatic working system according to claim 5, wherein if the second recognition signal is received within a second preset time, the control module controls a movement pattern of the self-moving device based on the second recognition signal.

7. The automatic working system according to claim 5, wherein if the second recognition signal is not received within a second preset time, the control module controls the self-moving device to enter a safe working mode to change the action of the self-moving device.

8. The automatic working system according to claim 5, wherein if a confidence level of the second recognition signal is greater than a second preset value, the control module controls a movement pattern of the self-moving device based on the second recognition signal.

9. The automatic working system according to claim 1, wherein:

the first recognition module invokes a preset first deep learning model;

the second recognition module invokes a preset second deep learning model; and a quantity of model parameters of the preset second deep learning model is greater than that of the preset first deep learning model.

10. The automatic working system according to claim 9, wherein the server further includes:

a software update module configured to generate an update data packet based on the environmental image and/or the first recognition signal;

a communication module configured to send the update data packet to the self-moving device; and the control module configured to update the first recognition module based on the update data packet.

11. A self-moving device comprising:

an image detection module configured to detect an environment around the self-moving device to generate an environmental image;

a first recognition module configured to recognize a specific object in an image based on the environmental image to generate a first recognition signal;

a first communication module configured to selectively send at least one of the environmental image or the first recognition signal to a server and receive a second recognition signal corresponding to the environmental image; and a control module configured to control an action of the self-moving device based on at least one of the first recognition signal or the second recognition signal, including:

determining that the first recognition signal is not received within a preset time, and in response to the first recognition signal being not received within the preset time, controlling the first communication module to send the environmental image to the server and receive the second recognition signal generated based on the environmental image, wherein the control module is further configured to send an authorization request to a user equipment, receive an authorization signal sent by the user equipment, and control the first communication module based on at least one of the authorization signal to send the environmental image or the first recognition signal to the server.

12. The self-moving device according to claim 11, further comprising a battery module, wherein the control module is further configured to control, based on that a state of charge of the battery module is less than a preset state of charge, the first communication module to be disconnected from the server.

13. The self-moving device according to claim 11, wherein when the first communication module works normally, the control module sends the environmental image and/or the first recognition signal to the server, and receives the second recognition signal.

14. The self-moving device according to claim 13, wherein if the second recognition signal is received within a second preset time, the control module controls a movement pattern of the self-moving device based on the second recognition signal.

15. The self-moving device according to claim 13, wherein if the second recognition signal is not received within a second preset time, the control module controls the self-moving device to enter a safe working mode to change the action of the self-moving device.

16. The self-moving device according to claim 13, wherein if a confidence level of the second recognition signal is greater than a second preset value, the control module controls a movement pattern of the self-moving device based on the second recognition signal.

17. The self-moving device according to claim 11, wherein the first communication module comprises a 5th generation mobile communication module or a mobile communication module with a maximum transmission speed greater than 1 Gbps.

18. The self-moving device according to claim 11, wherein the environmental image comprises an original image or a processed image.

19. The self-moving device according to claim 11, wherein the preset condition including that the first recognition signal is received within the first preset time, and the first preset time is measured from when the image detection module transmits the environmental image to the first recognition module.

20. A self-moving device comprising:

an image detection module configured to detect an environment around the self-moving device to generate an environmental image;

a first recognition module configured to recognize a specific object in an image based on the environmental image to generate a first recognition signal;

a first communication module configured to selectively send at least one of the environmental image or the first recognition signal to a server and receive a second recognition signal corresponding to the environmental image; and a control module configured to control an action of the self-moving device based on at least one of the first recognition signal or the second recognition signal, including:

determining that the first recognition signal is not received within a preset time, in response to the first recognition signal being not received within the preset time, controlling the first communication module to send the environmental image to the server and receive the second recognition signal generated based on the environmental image, and in response to the second recognition signal being not received within a second preset time, controlling the self-moving device to enter a safe working mode.

* * * * *